United States Patent [19]

Marchant et al.

[11] 4,292,209

[45] Sep. 29, 1981

[54] CERAMIC COMPONENT FOR MHD ELECTRODE

[75] Inventors: David D. Marchant; Junior L. Bates, both of Richland, Wash.

[73] Assignee: The United States of America as represented by the United States Department of Energy, Washington, D.C.

[21] Appl. No.: 35,158

[22] Filed: May 2, 1979

[51] Int. Cl.$^3$ ................................................. H01B 1/06
[52] U.S. Cl. ................................... 252/521; 252/520; 310/11; 429/218; 501/152
[58] Field of Search .................. 252/520, 521; 310/11; 106/73.2, 39.5; 429/218

[56] References Cited

U.S. PATENT DOCUMENTS

| | | | |
|---|---|---|---|
| 3,523,915 | 8/1970 | Anthony et al. | 252/520 |
| 3,574,142 | 4/1971 | Yerouchalmi | 252/520 |
| 4,128,776 | 12/1978 | Boquist et al. | 310/11 |
| 4,180,484 | 12/1979 | Marchant | 252/521 |

*Primary Examiner*—Brooks H. Hunt
*Assistant Examiner*—J. L. Barr
*Attorney, Agent, or Firm*—James W. Weinberger; Frank H. Jackson; James E. Denny

[57] ABSTRACT

A ceramic component which exhibits electrical conductivity down to near room temperatures has the formula:

$Hf_x In_y A_z O_2$ where $x = 0.1$ to $0.4$, $y = 0.3$ to $0.6$, $z = 0.1$ to $0.4$ and A is a lanthanide rare earth or yttrium. The component is suitable for use in the fabrication of MHD electrodes or as the current leadout portion of a composite electrode with other ceramic components.

5 Claims, 2 Drawing Figures

CERAMIC COMPONENT FOR MHD ELECTRODE

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a ceramic component which is electrically conductive at low temperatures. More specifically, this invention relates to a ceramic component which is electrically conductive at low temperatures and which can be used for the preparation of electrodes suitable for use in the channel of the magnetohydrodynamic (MHD) generator or as the current leadout portion of an MHD electrode for use in a high-temperature MHD channel.

The environmental conditions within an operating MHD channel are very severe, and strenuous physical demands are placed on electrodes which must function in this environment. The plasma, which is an ionized gas or an inert gas seeded with as ionizing agent such as potassium, may reach temperatures up to 3000 K., while surface of the electrode may reach 2000 K. However, since the electrodes are attached directly to metal conductor frames which are generally of copper, the electrode-conductor temperatures can be no more than about 600–1000 K. Thus, the electrodes must be capable of withstanding a temperature differential between electrode-plasma interface and the electrode-conductor interface of up to about 1400 K. The electrodes must be able to withstand erosive forces from the plasma as it passes through the duct at near sonic velocities and they must either be protected from oxidation or be prepared from oxidation-resistant materials, since many plasmas, depending upon the particular fluid and its source, are oxidizing ($P_{O2}=101$ Pa) at operating temperature. The electrodes must also be able to withstand the highly corrosive effects of gaseous or molten potassium or coal slag when present in the plasma. The electrodes must be able to withstand the effects of electrochemical reactions which occur due to the passage of direct electric current through the anode and cathode in the presence of an electrolyte, i.e. the potassium seed or coal slag. Finally, the electrodes must be constructed of materials which are electrically conductive at the normal operating temperature of the channel and preferably at low temperatures and which can withstand the thermal shock of sudden temperature changes due to generator malfunction without the electrode separating from the channel or without electrode disintegration. Thus, it is a problem to find materials from which electrodes can be made which can withstand the rigors of such an environment.

Most of the materials which are best able to withstand the rigors of an operating MHD channel are generally ceramic-type in nature. These materials include zironia and hafnia stabilized with various oxides such as ceria, yttria or terbia, spinel doped with iron or chromium and yttria and lanthanum-chromite doped with strontium and magnesia. While all of these materials have adequate electrical conductivity at MHD operating temperatures, most of them, particularly the hafnia and zirconium based materials, have very low electrical conductivity at the lower temperatures ranging from room temperature up to 1200 to 1300 K. The low electrical conductivity or high resistivity of these materials at the lower temperatures is detrimental to the electrical performance and channel efficiencies. For example, the passage of large electric currents through these materials with low electric conductivity results in ohmic heating, higher voltages and possible decomposition. The voltages required to push the current through the resistive areas of the electrode decrease the electrical efficiencies of the MHD generator. The higher voltages may also cause electrochemical degradation of the material and ultimately leads to premature destruction of the electrodes. Attempts to solve these problem have led to the use of metal inserts in the ceramic electrodes as a low-temperature current leadout or to the use of a composite electrode consisting of a metal lower current leadout portion topped with a ceramic capable of withstanding the MHD environment. This solution has caused other problems such as (1) cracking, separation or spalling, due in large measure to the difference in the coefficient of expansion between the metal and ceramic, (2) electrochemical interactions between the metal and ceramic, and (3) increased difficulty and cost of manufacture.

SUMMARY OF THE INVENTION

A new ceramic component has been prepared, based on hafnia, which has a relatively high electrical conductivity at low temperature even down to room temperature. The ceramic component of the invention has the formula: $Hf_xIn_yA_zO_2$, where $x=0.1$ to 0.4, $y=0.3$ to 0.6, $z=0.1$ to 0.4 and A is a rare earth or yttrium. The ceramic component can be used for preparing electrodes for use in moderate-temperature MHD channels, that is channels which generally operate at temperatures below about 1500 K. For operation in MHD channel at temperatures above 1500 K, the ceramic component is preferably used as an electrode current leadout in conjunction with a compatible high-temperature-resistant ceramic cap. The ceramic component of the invention is suitable for use with the stabilized zirconias and hafnias and in particular with the terbium-stabilized rare earth hafnias as described in U.S. Patent Application 915,419, filed June 14, 1978 now U.S. Pat. No. 4,180,484 and assigned to the common assignee. Preferably, when used in conjunction with the terbium-stabilized hafnias, the rare earth component in the cap portion and the leadout portion will be the same to provide improved compatibility.

It is therefore one object of the invention to provide a ceramic component suitable for use in MHD generator channels which is electrically conductive down to room temperature.

It is another object of the invention to provide a ceramic component which is suitable for preparing electrodes for use in MHD generator channels operating up to about 1500 K.

Finally, it is the object of the invention to provide a ceramic component which is electrically conductive at room temperatures and which is suitable for preparing the low-temperature current leadout portion of an electrode to be used in MHD generator channels operating up to 2200 K.

DETAILED DESCRIPTION OF THE PREFERRED EMBODIMENT

These and other objects of the invention may be met by a ceramic component having the formula: $Hf_xIn_yA_zO_2$ where $x=0.1$ to 0.4, $y=0.3$ to 0.6, $z=0.1$ to 0.4 and A is a rare earth yttrium.

The amount of rare earths or yttria present in the component must be sufficient to stabilize at least 60 volume percent of the hafnia into the cubic structure. This is necessary to prevent overall destruction of the mechanical integrity of the electrode due to crystallographic changes in the hafnia when it is heated. It is also believed that the rare earths or yttrium in the component help to stabilize the indium oxide. Any of the rare earths as oxides or yttria may be used for this purpose, either alone or in combination. In addition to yttria, the rare earth oxides found to be particularly suitable are cerium, praseodymium, terbium and ytterbium.

It is important that the ceramic component contain sufficient indium to provide the desired electrical conductivity in the electrode. Generally, from about 0.3 to 0.6 mole percent indium has been found to be sufficient.

The ceramic component is suitable for preparing simple electrodes which may be used when the temperature of the environment will be no greater than about 1500 K. When the electrode is to be subjected to temperatures greater than about 1500 K, the ceramic component of the invention is best utilized in a composite electrode as the current leadout or base portion of a two component electrode in which the upper or current collection portion of the electrode is a ceramic component which is electrically, chemically and mechanically compatible, is capable of withstanding temperatures of above 2200 K under a partial pressure of oxygen, is corrosion and erosion-resistant and is electrically conductive at temperatures above about 1400 K. Examples of suitable electrode materials are zirconia and hafnia stabilized with yttria, ceria, neodymia, praseodymia, calcium oxide or magnesium oxide. The component has been found particularly suitable when used with hafnia which has been stabilized by the addition of from 3 to 20 mole percent $Tb_4O_7$. The stabilized hafnia may also contain up to about 10 mole percent of a rare earth oxide such as $PrO_2$, $Yb_2O_3$ or a mixture of the two oxides. It is preferable that the current leadout and the current collector portions of the electrode each contain the same rare earth oxide to improve chemical compatibility within the electrode.

Figure 1:
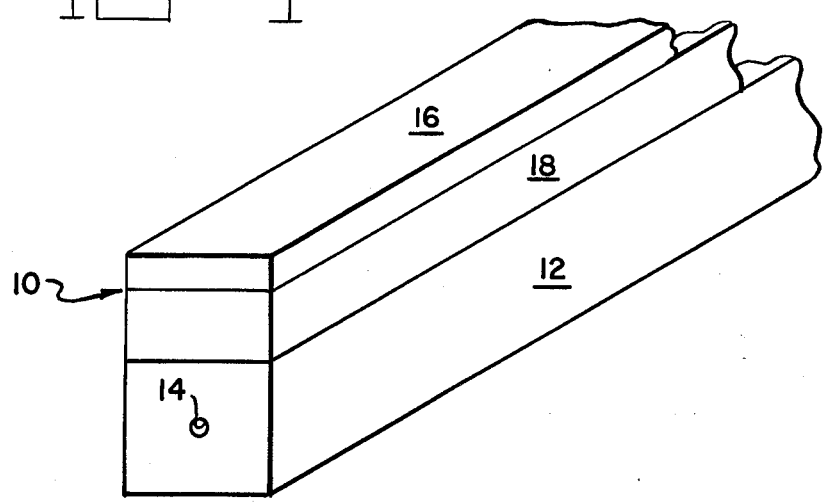
FIG. 1 is a perspective view of a composite electrode mounted on a MHD channel frame utilizing the ceramic component of the invention as the current leadout.

Referring to FIG. 1, an MHD electrode 10 is shown brazed to a copper MHD frame 12 containing a coolant passageway 14. Electrode 10 consists of an upper or cap portion 16 and a lower current leadout portion 18 prepared of the ceramic component of the invention. Cap portion 16 may be prepared of any of the compatible ceramic components which are known to be suitable for use in an MHD environment such as the hereinbefore described. The relative thicknesses of each section will depend upon the particular environment to which the electrode is to be subjected. The electrodes may be prepared by cold pressing powders of the two different ceramic components together into an electrode shape and sintering the resulting shape under suitable conditions.

Preferably, the ceramic component is prepared by coprecipitating compounds of the desired materials rather than by simply mixing together the oxide powders in order to prepare an electrode which is a chemical composition or compound of the materials.

EXAMPLE I

A number of test bars were prepared by sintering cold-pressed coprecipitated powders of several different compositions. Indium (III) was coprecipitated with other ions (Pr IV, Yb III, Hf IV) as a hydroxide in a very basic solution. The $In_2O_3$ powder, which is the source of In (III), and other oxide powders ($PrO_2$, $Yb_2O_3$) with the exception of $HfO_2$ were dissolved into a concentrated $HNO_3$ solution. The source of Hf (IV) was $HfOCl_2 \cdot 8H_2O$ which was dissolved into distilled $H_2O$ and subsequently added to the acid solution with the other metal ions. The acidic solution of In (III) and other ions was then added slowly (50 ml/min) to concentrated $NH_4OH$ and the insoluble hydroxides precipitated. Enough ammonium hydroxide was used so the final pH of the system was 10 or above when precipitation was complete.

To obtain the finest particles of the insoluble solid which precipitated, the coprecipitate was washed repeatedly with acetone and toluene. First, the coprecipitate was suspended two times in acetone and then two more times in toluene. In toluene, the suspensions were translucent. The initial acetone washes convert the system to an organic medium while the toluene washes rid the system of $H_2O$. A final acetone wash rids the system of the high-boiling toluene and replaces it with the low-boiling acetone.

The coprecipitate hydroxides were then dried at ~360 K (in air) and ground in a warm mortar to expedite the drying process. The powder was then calcined at 1373 K for two hours to produce the coprecipitate oxides.

The coprecipitate oxides were then pressed into test bars by first cold-pressing the powder at ~3.4 MPa and, subsequently, pressing the cold-pressed bar isostatically in water-soluble oil at ~13.8 MPa. Sintering the bars in air at 1973 K for four hours results in densities greater than 90% of theoretical density. The powders could also be plasma sprayed to obtain the desired shapes.

Figure 2:
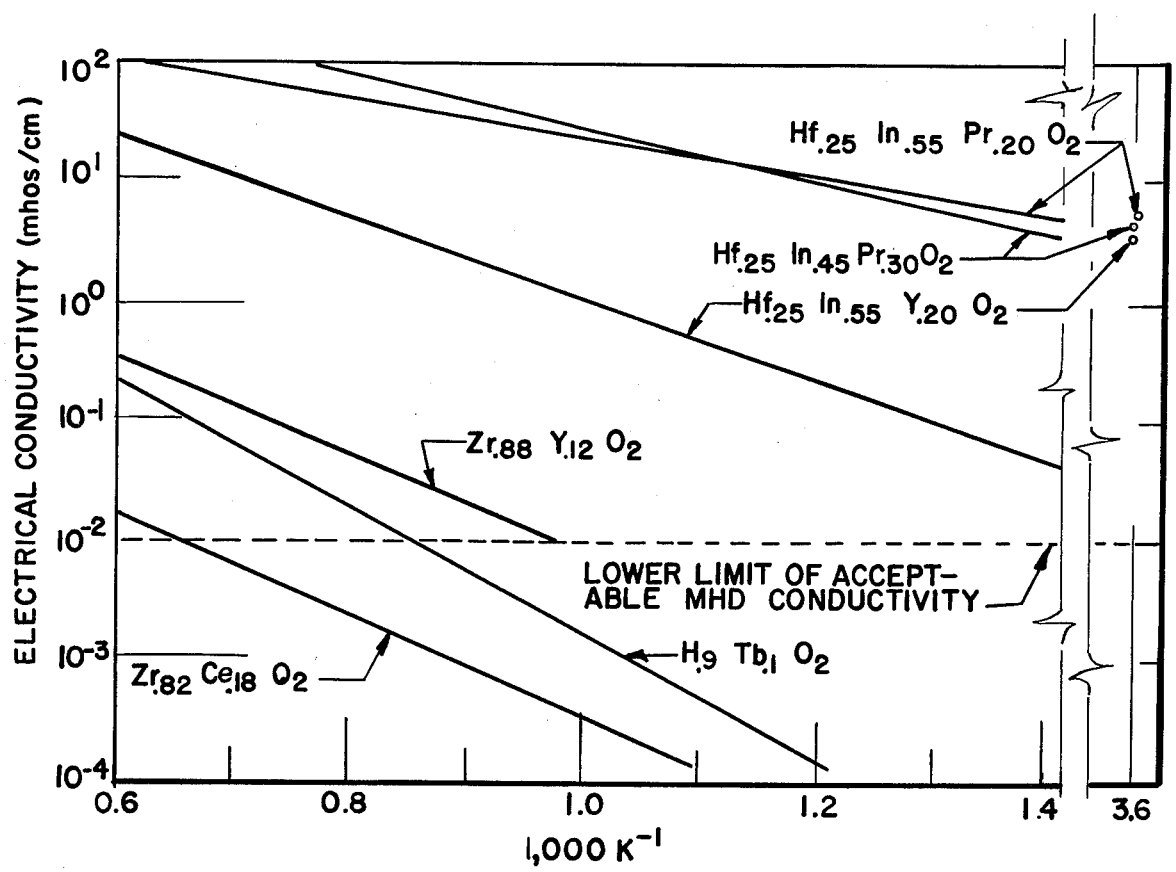
FIG. 2 is a graph comparing the electrical conductivity of a number of ceramic electrode materials at various temperatures.

The bars were then tested to determine the conductivity of the ceramic components at various temperatures. The results of this test are shown in FIG. 2 where they are compared with other electrode materials. It will be noted that the ceramic component of this invention has a much higher conductivity at the higher temperatures and that this increased conductivity continues on down to almost room temperature. Note also that the conductivity of the component having the formula $Hf_{.25}In_{.55}Y_{.2}O_2$ was higher at room temperature than it was at higher temperatures. Dashed line 10 is shown to indicate the generally accepted lower limit for electrical conductivity.

EXAMPLE II

A number of test bars were prepared in the manner described in Example I except that a platinum wire was pressed into each bar as an electrical connector. The bars were subjected to electrochemical tests by immersing two similar bars in an elelctrolyte and passing a current between them. The results are given in Table I below.

TABLE I

Electrochemical Tests on Several Indium Containing Compounds

| Test | Composition Electrode | Electrolyte | Temp. K | Current Density, A/cm$^2$ | Time, min. | Corrosion Rate, µg/coul Anode | Corrosion Rate, µg/coul Cathode |
|---|---|---|---|---|---|---|---|
| 182 | $Yb_{0.34}In_{0.51}Hf_{0.14}O_2$ | $K_2SO_4$ | 1373 | 1.1 | 1140 | 87 | 19* |
| 192 | $Yb_{0.09}In_{0.10}Hf_{0.81}O_2$ | Montana Rosebud | 1923 | 1.2 | 305 | 53 | 195 |
| 184 | $Yb_{0.25}In_{0.50}Hf_{0.25}O_2$ | Montana Rosebud | 1723 | 1.1 | 1407 | 95 | 9.8 |
| 188 | $Yb_{0.30}In_{0.45}Hf_{0.25}O_2$ | Montana Rosebud | 1723 | 1.2 | 590 | 263 | 89 |

*Test terminated due to platinum leadout loss from cathode.

It should be noted that, while the corrosion rates are acceptably low, they are somewhat higher than some other electrode materials.

EXAMPLE III

A number of sintered ceramic bars were prepared in which a center section, labeled B in Table II below, represented a hot electrode and was joined at both ends to a second, current leadout component labeled A in the table.

TABLE II

| A | B |
|---|---|
| $In_{0.5}Hf_{0.25}Yb_{0.25}O_2$ | $Hf_{0.78}Yb_{0.15}Tb_{0.07}O_2$ |
| $In_{0.45}Pr_{0.30}Hf_{0.25}O_2$ | $Hf_{0.80}Pr_{0.20}O_2$ |
| $In_{0.55}Hf_{0.25}Y_{0.20}O_2$ | $Hf_{0.759}Ce_{0.093}Y_{0.148}O_2$ |
| $In_{0.45}Pr_{0.30}Hf_{0.25}O_2$ | $Hf_{0.85}Pr_{0.05}Yb_{0.10}O_2$ |

The graded compositions were made to duplicate a cathode current leadout/hot electrode/anode current leadout geometry using the indium-doped hafnium oxide as a current leadout. A direct current with a density of 1.0 amp/cm$^2$ was passed through the bars at 1273 K and 1573 K in air for 100–500 hours to evaluate electrochemical decomposition-interaction. No seed or slag were present.

None of the bars failed even though some cracking did occur in the electrodes, probably due to thermal shock or fabrication difficulties. No decomposition or cracking occurred at the electrode-current leadout interfaces were significant electrochemical interaction would cause degradation or gas formation. Only slight darkening at the cathode interface was observed.

As has been shown by the discussion and examples, the ceramic component of this invention combines good electrical conductivity, particularly at the lower temperatures, along with a capability of withstanding the environment within an operating MHD channel, and is thus suitable for use in preparing simple electrodes for use in an intermediate temperature MHD channel or in preparing the current leadout portion of a composite electrode for use in a high temperature MHD channel.

We claim:

1. A ceramic component for an MHD generator electrode having the formula: $Hf_xIn_yA_zO_2$ where x=0.1 to 0.4, y=0.3 to 0.6, z=0.1 to 0.4 and A is one or more elements selected from the group consisting of yttrium, ytterbium, terbium, praseodynium and cerium.

2. A composite electrode for use in a magnetohydrodynamic generator comprising:
   a base portion constructed of a ceramic component having the formula: $Hf_xIn_yA_zO_2$ wherein x=0.1 to 0.4, y=0.3 to 0.5, z=0.2 to 0.4 and A is one or more elements selected from the group consisting of yttrium, ytterbium, terbium, praseodynium and cerium, and
   a cap portion attached to the base, the cap being constructed of a ceramic component selected from the group consisting of stabilized zirconium oxide, stabilized hafnium oxide and terbium stabilized hafnium.

3. The electrode of claim 1 wherein the cap portion is terbium stabilized hafnium.

4. The electrode of claim 3 wherein the terbium stabilized hafnium also contains up to about 10 mole percent of a rare earth oxide selected from the group consisting of $PrO_2$, $Yb_2O_3$ and a mixture of $Pr_2O_2$ and $Yb_2O_3$.

5. An electrode for use in a magnetohydrodynamic generator comprising:
   a ceramic component having the formula: $Hf_xIn_yA_zO_2$ where x=0.1 to 0.4, y=0.3 to 0.6, z=0.1 to 0.4 and A is one or more elements selected from the group consisting of yttrium, ytterbium, terbium, praseodynium and cerium.

* * * * *